April 28, 1925.
J. MARINOS
SOLDERING IRON
Filed May 27, 1924
1,535,933
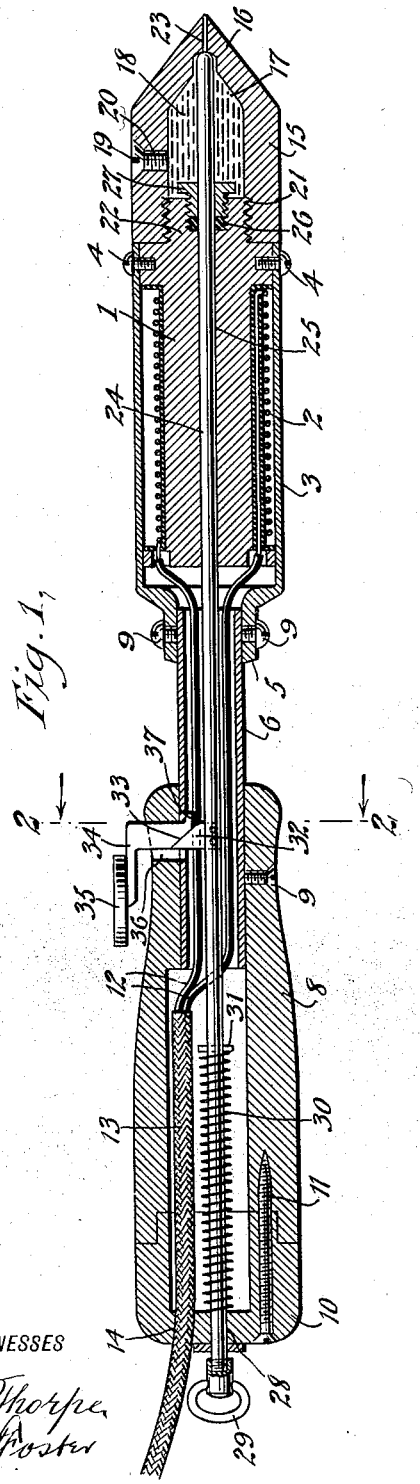
WITNESSES
Edw. Thorpe
J.W. Foster
INVENTOR
John Marinos
BY
Munn & Co
ATTORNEYS Patented Apr. 28, 1925.

1,535,933

UNITED STATES PATENT OFFICE.

JOHN MARINOS, OF NEW YORK, N. Y., ASSIGNOR OF ONE-HALF TO MILTON W. EMMETT, OF SEATTLE, WASHINGTON.

SOLDERING IRON.

Application filed May 27, 1924. Serial No. 716,184.

*To all whom it may concern:*

Be it known that I, JOHN MARINOS, a citizen of the United States, and a resident of the city of New York (borough of Manhattan), in the county and State of New York, have invented a new and Improved Soldering Iron, of which the following is a full, clear, and exact description.

This invention relates to soldering irons, an object of the invention being to provide a soldering iron which has a compartment for solder so that the heat of the iron melts the solder and the discharge of the solder from the iron is manually controlled.

In the ordinary use of soldering irons it has been the practice for the workmen to heat the iron and apply solder to the end thereof to cause the solder to melt and to position the solder on the work by the hot iron. This not only requires two hands but also is a difficult operation in many cases and a slow one because the solder frequently chills too soon. Furthermore, there is a great waste of material, and it is the purpose of my invention to provide a soldering iron which contains its own solder and which allows the same to escape in molten form so that it can be applied wherever desired and the entire manipulation of the iron be controlled by one hand so that the iron can be easily moved into and out of awkward places.

A further object is to provide an electrically heated soldering iron having a chamber for solder in the point for pot-handling the iron and having a manually controlled valve to regulate the escape of solder from the hot iron.

With these and other objects in view, the invention consists in certain novel features of construction and combinations and arrangements of parts which will be more fully hereinafter described and pointed out in the claims.

In the accompanying drawings—

Figure 1 is a view in longitudinal section through a soldering iron embodying my invention;

Figure 2 is a view in transverse section on the line 2—2 of Figure 1.

1 represents a metal core around which a resistance wire 2 or other electric heating element may be positioned. This heating element is enclosed in a casing 3 secured at one end to the core by means of screws 4 and at its other end having a restricted neck 5 which receives a tube 6, the latter projecting into a handle 8 of wood or other non-heat conducting material.

The tube 6 is fixed in the neck 5 and in the handle 8 by screws 9, and a removable plug 10 is secured in the rear end of the hollow handle 8 by means of a screw or screws 11. The electric wires 12 communicating with the resistance coil 2 extend through the tube 6 and into a flexible cable 13 which projects through the opening 14 in the plug 10.

At the forward end of the core 1, I provide a member 15 which I term "the tip of the iron" although this part 15 is virtually the iron per se. This tip 15 is of any suitable shape but preferably of the ordinary type having a pointed end 16, and said tip 15 is hollow, providing a chamber 17 in which solder 18 is located. A screw 19 normally closes a threaded opening 20 in the side of tip 15 and through this opening 20 solder may be dropped to supply the chamber 17.

The tip 15 is internally screw-threaded at its rear end, as shown at 21, so that it can be screwed upon a threaded nipple 22 on the forward end of the core 1. It is obvious that the chamber 17 may be filled with solder by removing the tip and then replacing it, or the screw 19 may be removed for the admission of solder, as may be desired.

A relatively small orifice 23 is formed in the pointed end 16 of the tip 15 and constitutes an outlet for the molten solder. This outlet is normally closed by the forward end of a rod 24 constituting a valve. The rod 24 projects through a longitudinal bore 25 in core 1, and a stuffing box 26 with a suitable gland 27 is located at the forward end of the core 1 to prevent the molten solder from passing into the bore 25. The rod 24 extends through the core 1, through the tube 6, handle 8 and plug 9 and through an opening 28 in the end of the plug 10.

An eye 29 is preferably formed on the rear extremity of the rod 24 and this eye may serve as a hanger for the iron or to receive a tool to forcibly move the rod in the event that it should stick.

A coil spring 30 is located around the rod 24 between the plug 10 and a cross pin 31 on the rod so as to exert a forward pressure on the rod to normally close the orifice 23.

A cam plate 32 is fixed to the rod 24 and is engaged by a cam face 33 of a stem 34 of a push button 35. This stem 34 projects through an opening 36 in the handle 8 and tube 6 and has a laterally projecting lug 37 at its inner end engaging the inner face of the tube 6 and acts as a fulcrum for the push button and also prevents the accidental removal and loss of the push button.

In operation, after the electric current is turned on and the heating element causes the tip 15 to become sufficiently hot to melt the solder 18 thereon, the operator can manipulate the iron and press the button 35 to move the rod 24 rearwardly and allow the molten solder to flow out through orifice 23. As this molten solder flows it can be properly manipulated by the hot iron and hence there will be no waste of solder, no loss of time, and greater efficiency will be had. When the button 35 is released the spring 30 will move the rod 24 forwardly to close the orifice 23.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. A soldering iron comprising a heating element, a hollow tip removably connected to the heating element, said tip comprising a chamber for solder, a handle connected to the heating element, a rod projecting through the heating element and into the handle and functioning the valve to control the escape of solder through the orifice, a cam on the rod and a member projecting outside of the handle and engaging the cam within the handle to move the rod longitudinally.

2. A soldering iron comprising a heating element, a hollow tip having screw-threaded engagement with the heating element, said tip comprising a chamber for solder and having an outlet orifice in its end, a plug normally closing the opening in the tip through which solder can be admitted thereto, a handle, a tube connecting the handle and heating element, a rod functioning as a valve to control the orifice, said rod projecting through the heating element, tube and the handle, a spring around the rod to exert pressure thereon to normally close the orifice, a cam plate on the rod, a push button and a stem on the push button projecting through the handle and the rod and having a cam face engaging the cam plate whereby the rod is forced to move away from the orifice when the push button is depressed.

JOHN MARINOS.